Sept. 25, 1923.
N. METZ
RELIEF DEVICE FOR ROLLING MILLS
Filed Aug. 14, 1919
1,468,825
9 Sheets-Sheet 1
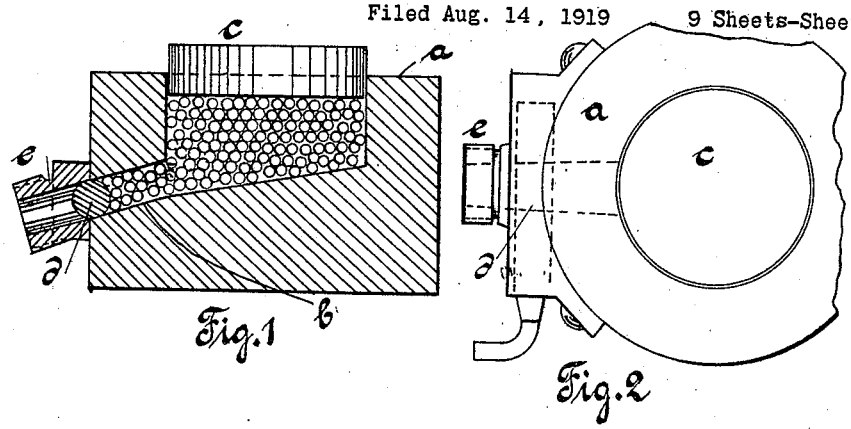
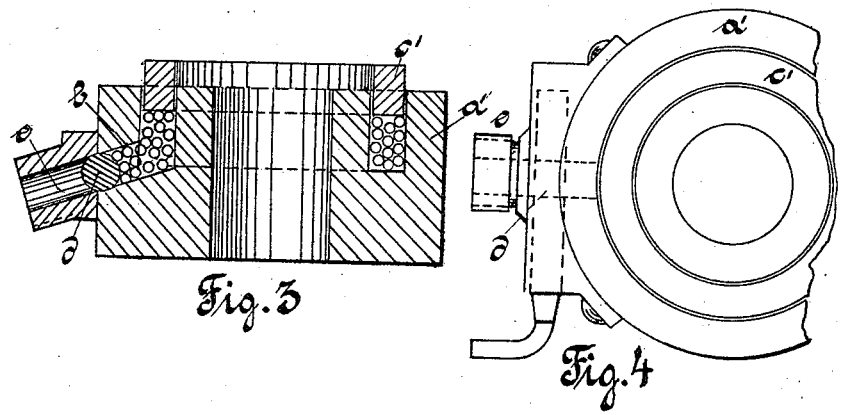
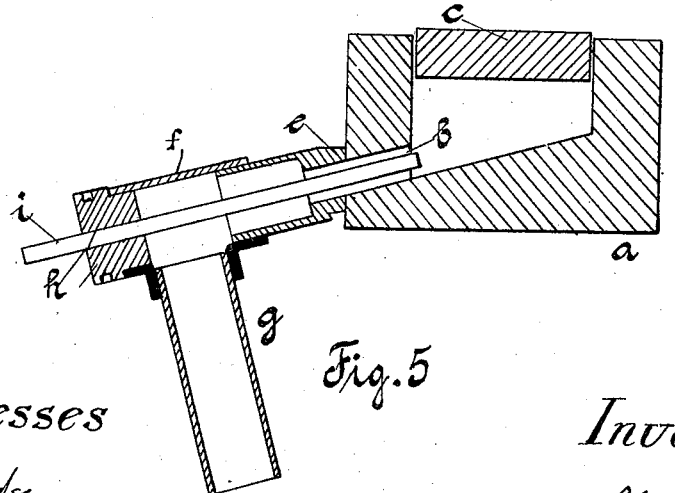
Witnesses
Inventor Sept. 25, 1923.  N. METZ  1,468,825
RELIEF DEVICE FOR ROLLING MILLS
Filed Aug. 14, 1919  9 Sheets-Sheet 2

Witnesses  Inventor

Sept. 25, 1923.  
N. METZ  
1,468,825  
RELIEF DEVICE FOR ROLLING MILLS  
Filed Aug. 14, 1919  9 Sheets-Sheet 3

Witnesses

Inventor

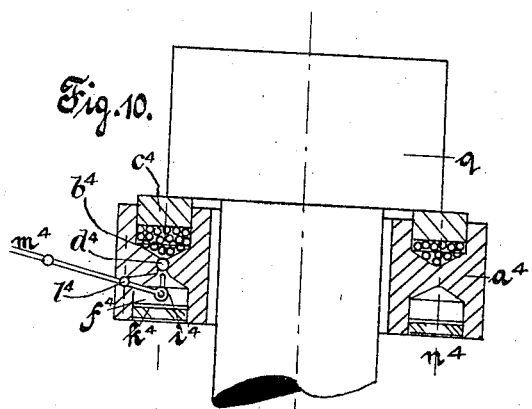
Fig.10.
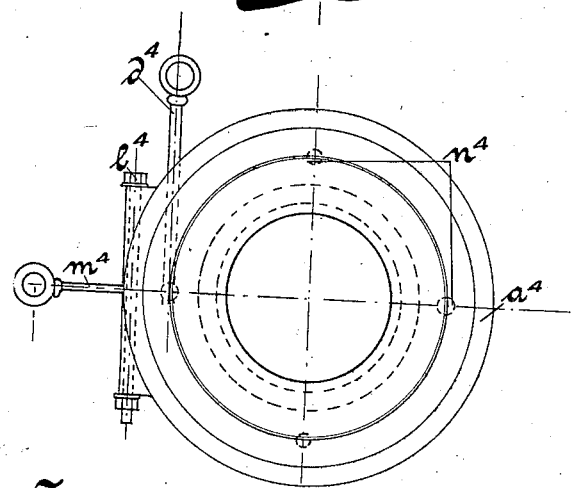
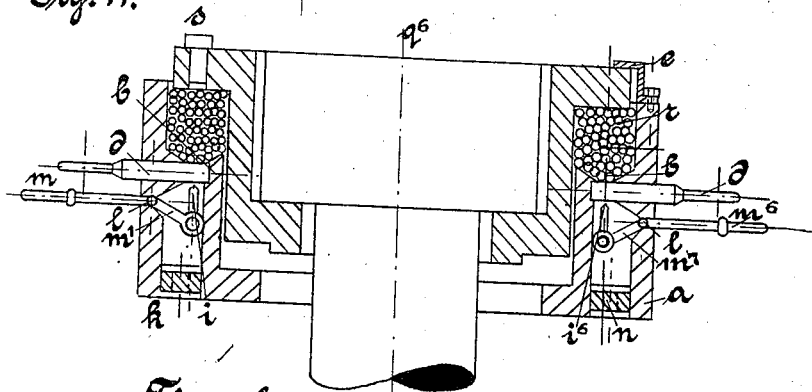
Fig.11.
Fig.16.

Sept. 25, 1923.
N. METZ
1,468,825
RELIEF DEVICE FOR ROLLING MILLS
Filed Aug. 14, 1919   9 Sheets-Sheet 5
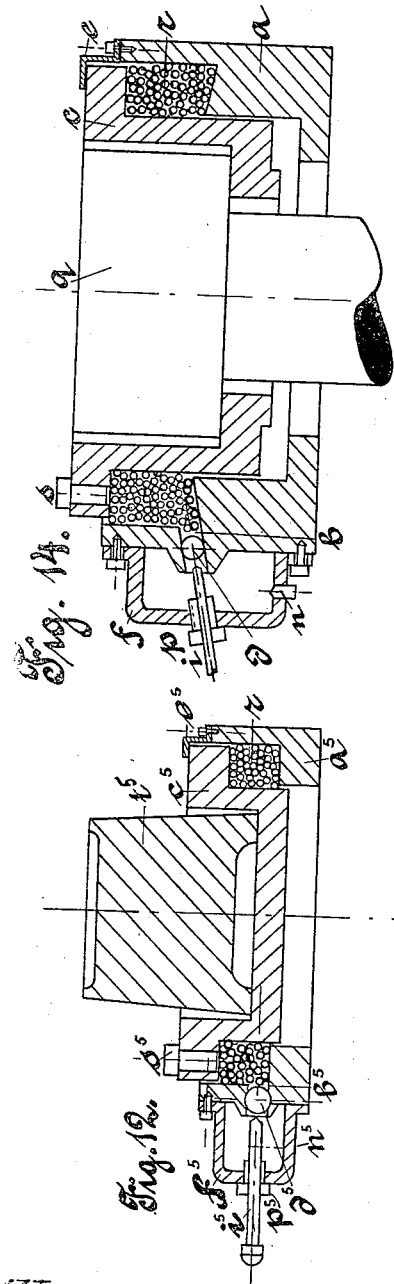
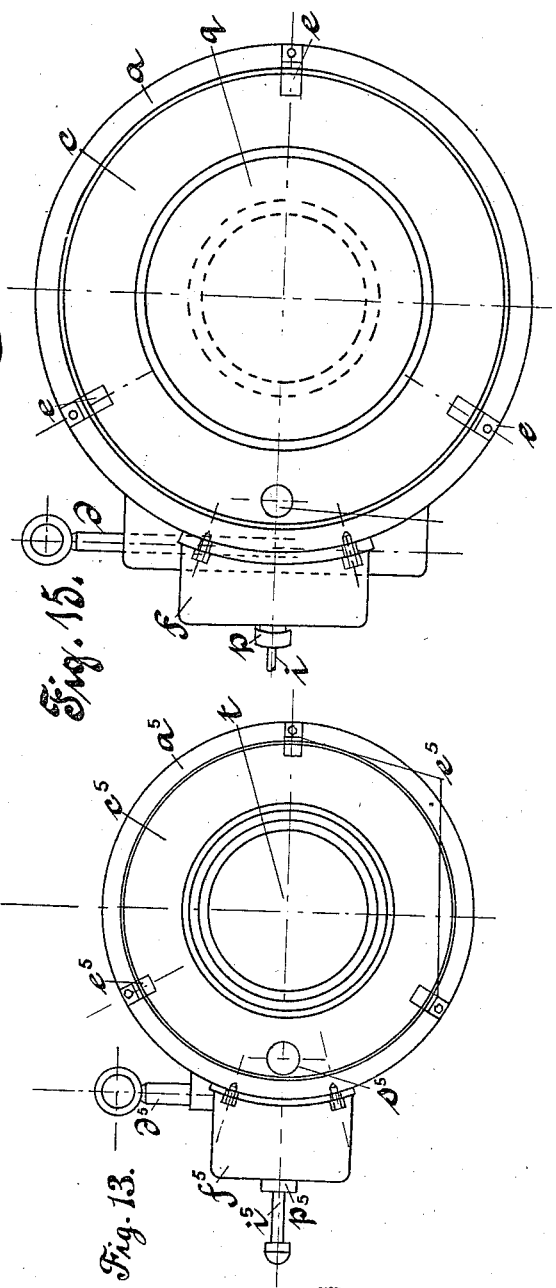
Witnesses
Inventor Sept. 25, 1923.  N. METZ  1,468,825
RELIEF DEVICE FOR ROLLING MILLS
Filed Aug. 14, 1919    9 Sheets-Sheet 6

Witnesses

Inventor

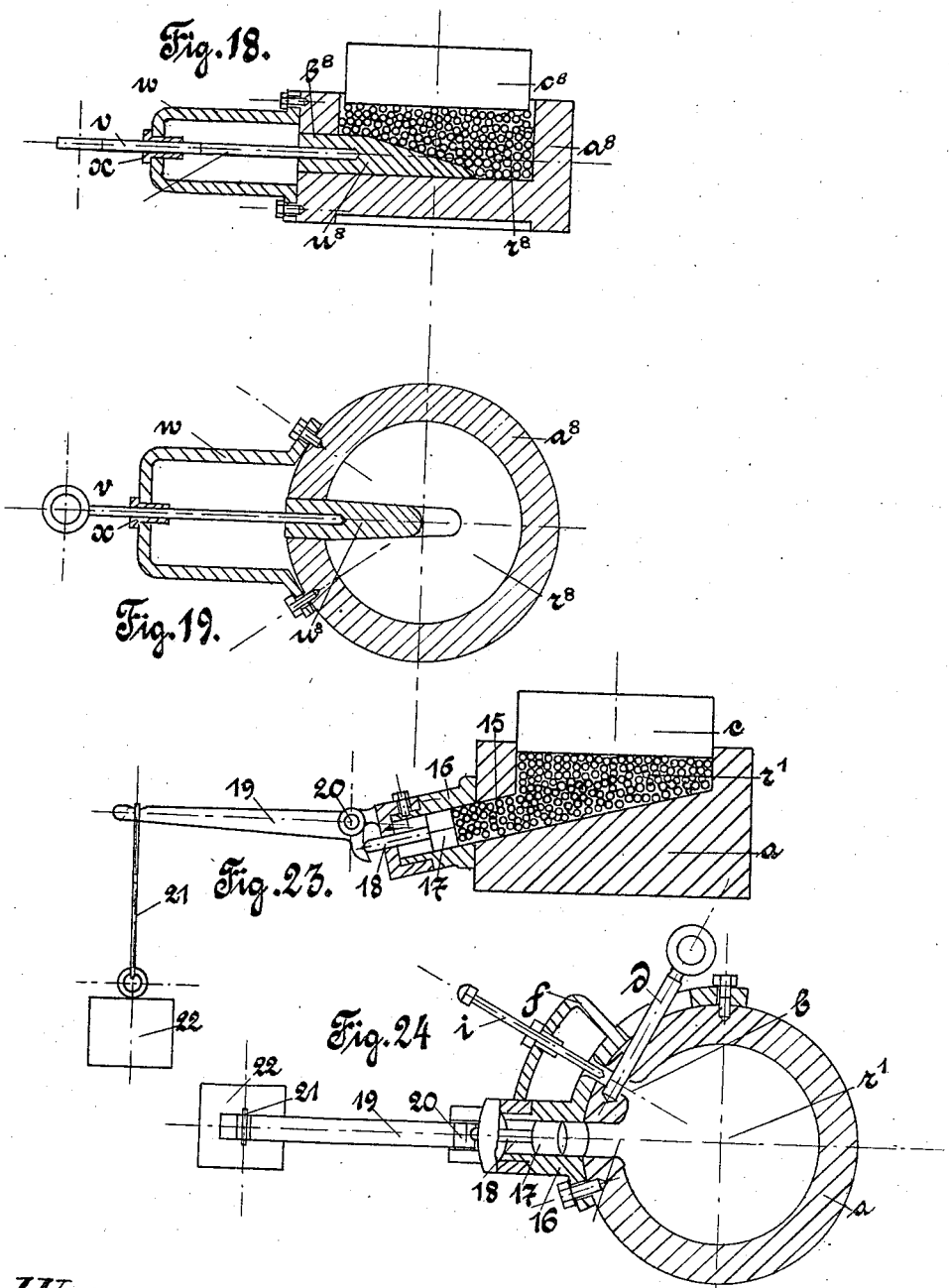

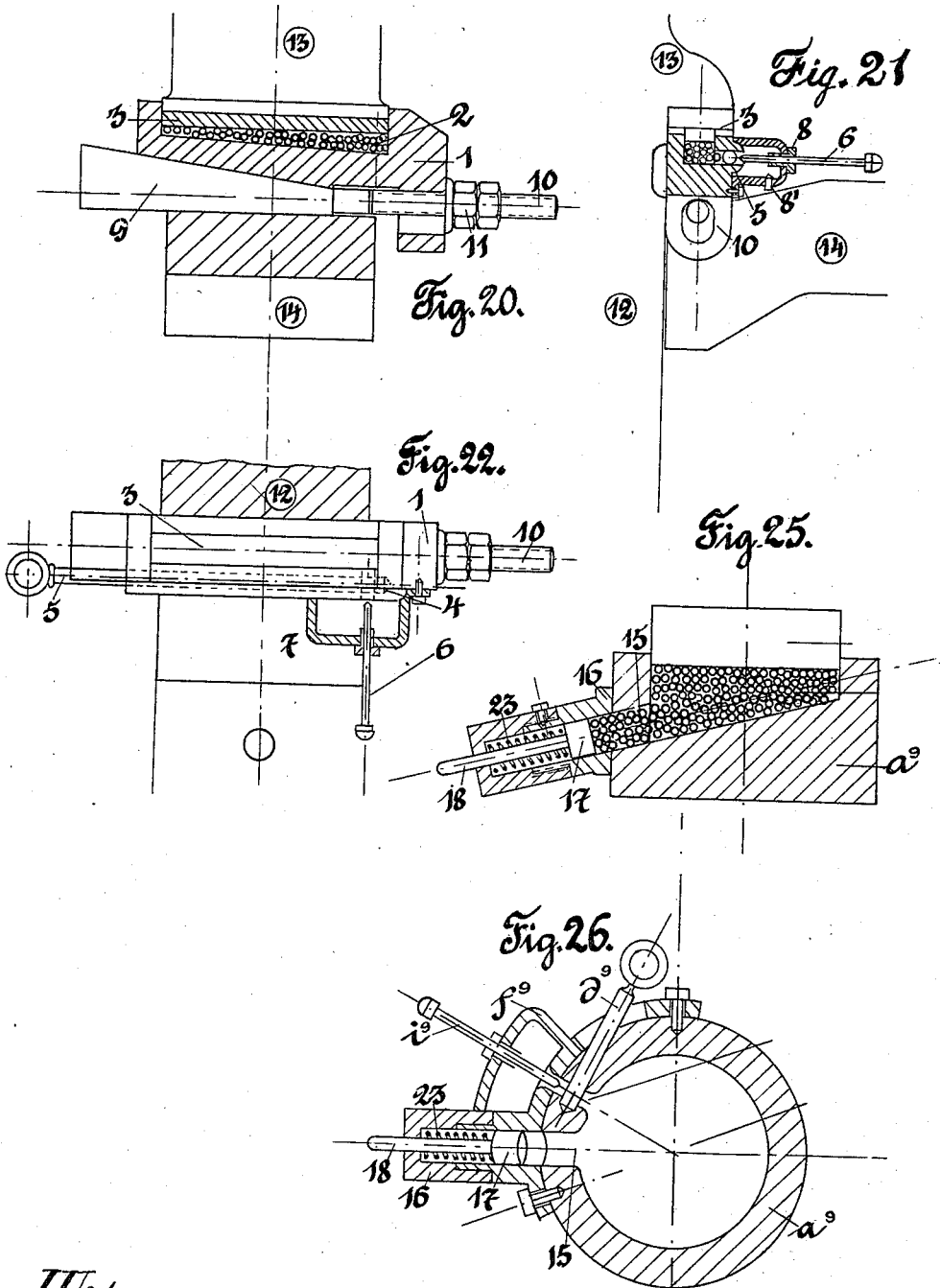

Patented Sept. 25, 1923.

1,468,825

UNITED STATES PATENT OFFICE.

NORBERT METZ, OF DUDELINGEN, LUXEMBURG.

RELIEF DEVICE FOR ROLLING MILLS.

Application filed August 14, 1919. Serial No. 317,613.

(GRANTED UNDER THE PROVISIONS OF THE ACT OF MARCH 3, 1921, 41 STAT. L., 1313.)

*To all whom it may concern:*

Be it known that I, NORBERT METZ, a citizen of the Grand Duchy of Luxemburg, residing at Dudelingen, Luxemburg, have invented certain new and useful Improvements in Relief Devices for Rolling Mills (for which I have filed applications for patent in Germany, July 17, 1917, and December 10, 1917; and in Hungary, April 17, 1918, in the name of the Vereinigte Huttenwerke Burbach-Eich-Dudelingen of Dudelingen, Grand Duchy of Luxemburg), of which the following is a specification.

This invention relates to the working of rolling-mills and has for its object to provide means for instantaneously interrupting the pressure which is produced between the rolls by the rolling-process. When the driving machine stops whilst a bar is held between the rolls, or when a bar is wound round one of the rolls, the tension between the two rolls must be done away with. This is hitherto effected by loosening the pressing-screws. If one does not succeed in doing so, the wedges of the cap-bolt must be loosened, and if even this cannot be effected, nothing is left but bursting asunder the breaking-piece, or forcibly removing the same between the pressing-screws and the "intermediate piece."

These operations are difficult and wearisome. The bar becomes cool and in reversing the machine the caliber may be damaged by the cooled bar. Therefore it would be of great utility and would afford a considerable progress in the operation of rolling-mills if a means for instantaneously loosening the rolls could be procured.

My invention enables me to produce such a device. It consists, broadly speaking, of a suitable vessel or container filled with balls or rolls or other bodies of sufficient strength and closed by a piston-like cover which vessel is interposed between the parts of the frame which are to be loosened (under the pressing screw. under the brackets, or on the wedges,) so that the cover of the vessel is loosened as soon as the balls, rollers or the like are withdrawn.

The apparatus is illustrated in the accompanying drawings, of which Figure 1 is a vertical section of an apparatus embodying my invention.

Fig. 2 is a plan view thereof.

Fig. 3 shows a vertical section of another form of the apparatus having an annular container and an annular cover, and Fig. 4 shows a plan view thereof.

Fig. 5 is a vertical section of an apparatus as shown in Figs. 1 and 2 provided with a device for removing obstructions of the balls and for collecting the same.

Fig. 10 is a vertical section, and Fig. 11 a plan view showing modification of the apparatus represented in Figs. 8 and 9, the container and the cover being of annular form.

Figs. 12 and 13 are a vertical section and a plan view, respectively, of another modification, the cover being countersunken and adapted for receiving the breaking-pot.

Figs. 14 and 15 are a vertical section and a plan view, respectively, of another modification, showing a countersunken annular cover receiving the head of the cap-bolt.

Figs. 16 and 17 represent in vertical section and plan view, respectively, a modification of the apparatus shown in Figs. 14 and 15, the ball collector being integral with the container.

Fig. 18 is a vertical, and Fig. 19 a horizontal section of a modification in which the pressure is suddenly reduced by withdrawing a wedge penetrating into the container.

Fig. 20 is a vertical section, Fig. 21 a horizontal section, and Fig. 22 a plan view of a modification in which the stationary wedge of the rolling mill forms the container.

Fig. 23 is a vertical, and Fig. 24 a horizontal section of an apparatus in which the pressure is controlled by a weighted lever acting on a piston.

Figs. 25 and 26 show in vertical and horizontal section, respectively, a modification, the piston being controlled by a spring.

Figure 27:
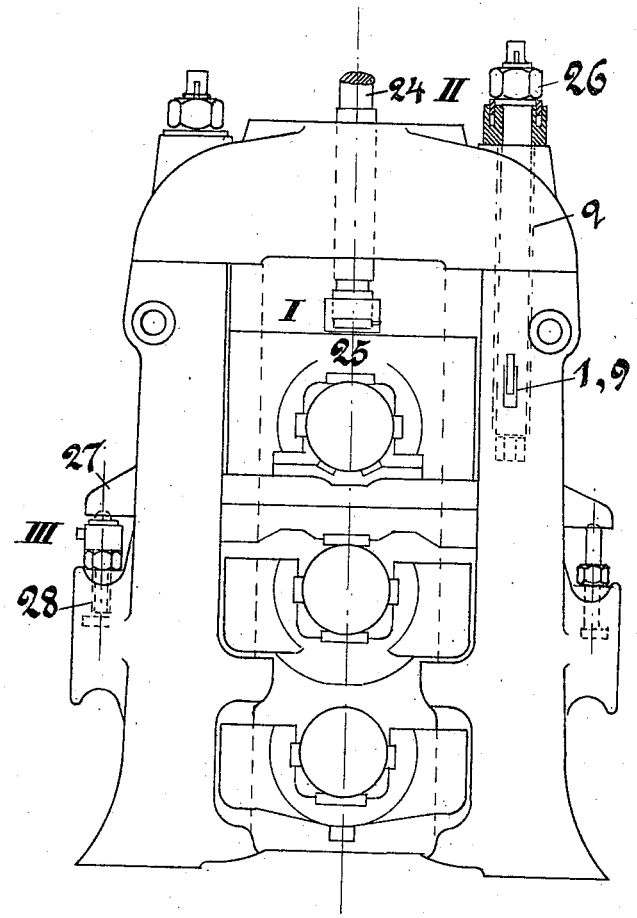

In Fig. 27 I have shown in what manner the apparatus forming the invention may be disposed in various places of the rolling mill.

The apparatus consists of a cylinder *a*

(Figs. 1 and 2) the bottom of which is preferably sloping against the opening $b$. To simplify the turner's work, a sloping bottom piece may be separately produced and laid on the flat bottom of the cylinder. The latter is filled with steel balls and its opening is covered with a piston-like cover $c$. The outlet-opening $b$ is closed by a plug $d$ operating in an appendix $e$.

In Figs. 3 and 4 the cylinder receiving the balls is of annular form. $a'$ is the annular cylinder, $b$ the outlet opening, $c'$ the annular cover, $d$ the plug, $e$ the appendix.

The apparatus is arranged in the frame of the rolling-mill in such a manner that it receives the pressure to the rolls. When the releasing device is removed, the balls flow out of the cylinder, the cover is lowered and the tension of the rolls is immediately removed.

The discharged balls are collected in a suitable vessel which is placed before the orifice of the lock. However, it may occur that the balls whilst flowing out become blocked or jammed. To prevent this, the device shown in Fig. 5 is used. To the appendix a tubular piece $f$ is secured the bottom of which is closed by a plug $h$ through which a rod $i$ is passed. The tube $f$ is connected with the ball-collector $g$. As soon as the balls cease to flow out, the rod $i$ is knocked in. Thereupon, the balls continue to flow out and the cover $c$ sinks down.

The ball-collector may be attached to or cast with the cylinder or the ring. In one modification the ball-collector and its rod is disposed beside the cylindrical form containing the balls and is attached to or cast with this form. This arrangement has the advantage that when the plug $d$ is removed, the ball-collector is always at the prescribed place and no balls are lost on removing the ball-collector after the rolls are loosened. Moreover, the interior of the ball-collector may be bored out conically so that the outlet is always disposed in the direction of the axis of this cone. By turning the apparatus the balls may be passed back into the cylinder. The rod is then most useful for driving the balls into the main device.

Figure 6:
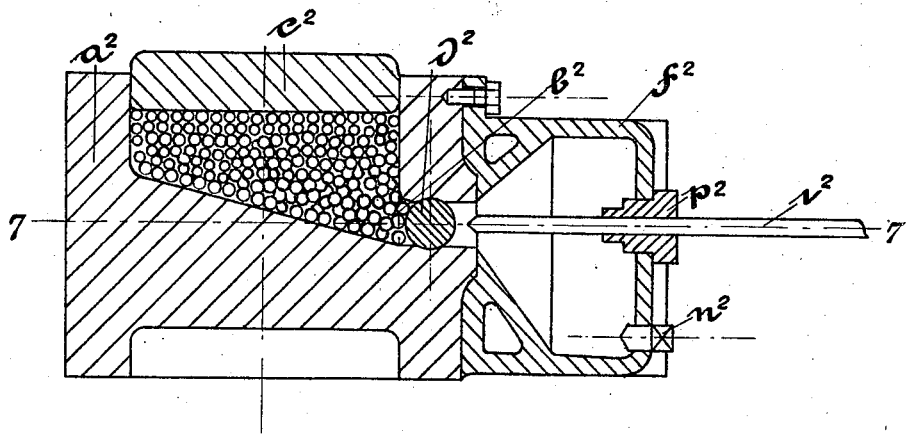
Fig. 6 is a vertical section, and Fig. 7 a horizontal section of the apparatus, the vessel for collecting the balls being of another form.
Figure 7:
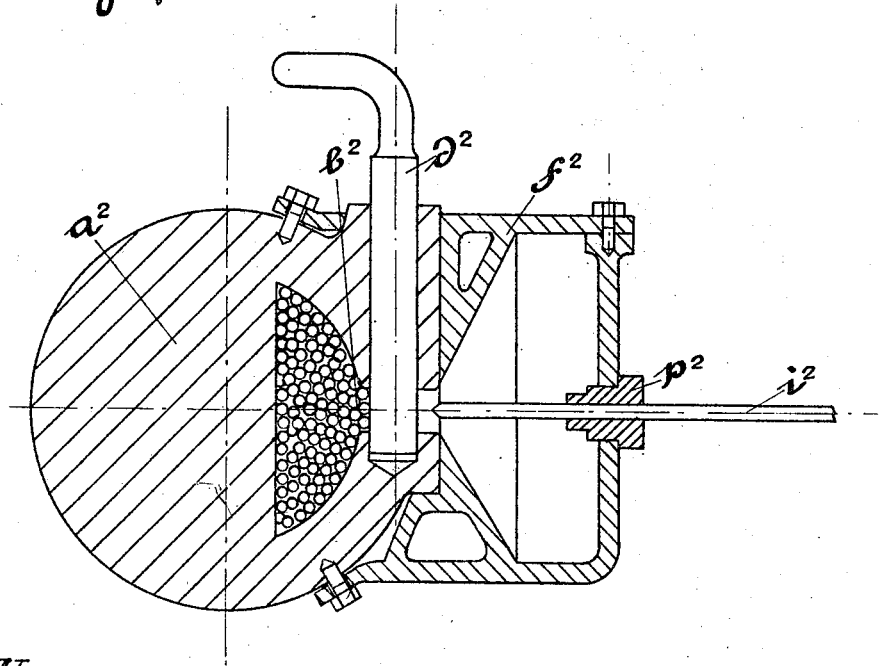

In Figs. 6 and 7, of which Fig. 6 shows a vertical central cross section, Fig. 7 a horizontal section through the line 7—7 in Fig. 6. $a^2$ is the cylinder containing the balls, $b^2$ the outlet opening, $c^2$ the piston-like cover, $d^2$ the plug, $f^2$ the ball-collector, $i^2$ the rod for loosening the balls when they become jammed, which may penetrate through the opening $p^2$ of the ball-collector into the outlet opening $b^2$. $n^2$ is an opening for removing the balls from the ball-collector.

Figure 8:
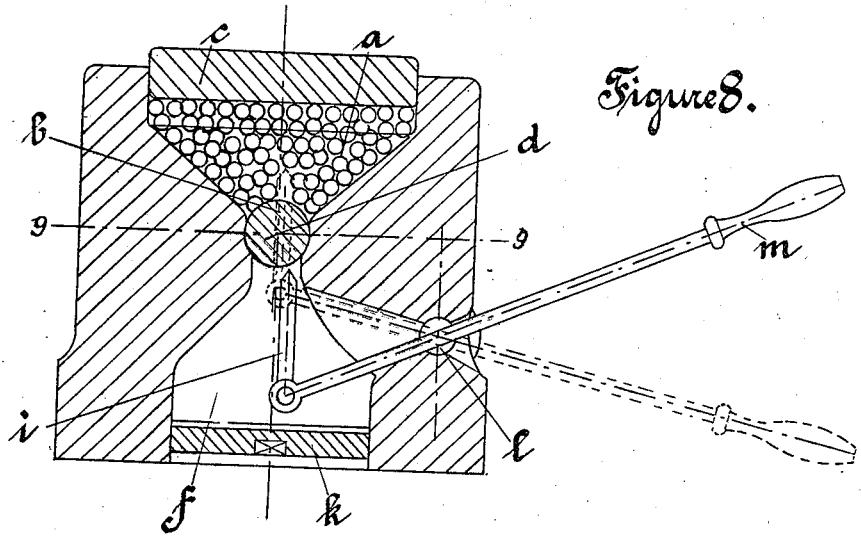
Figs. 8 and 9 show in vertical and horizontal section respectively a modified form of the collecting vessel being integral with the container.
Figure 9:
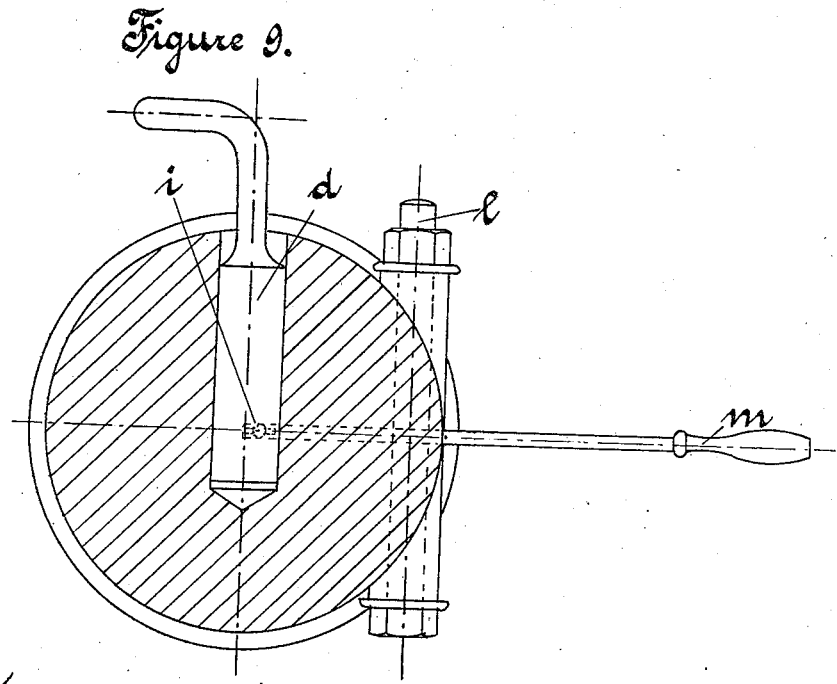

The Figures 8 and 9 show a roll-loosener in which the ball-collector is disposed under the part containing the balls, Fig. 8 being a vertical cross-section, Fig. 9 a horizontal section through the line 9—9 in Fig. 8. $a^3$ is the cylinder with the balls, the bottom of which is cone-shaped, $b^3$ is the outlet opening, $c^3$ the piston-like cover, $d^3$ the plug, $f^3$ the ball collector, $i^3$ the pin or ball or roll loosening member which is operated by means of a lever $m$ pivoted around the axis $l$. $k$ is the opening for removing the balls from the ball-collector. The outlet-opening is disposed in the middle of the cylinder the bottom part of which is of conical form. The top of the ball-collector is cone-shaped too. In this manner, it is possible to return the balls into the upper part of the apparatus by turning it, whereby any loss of balls is prevented.

In such apparatus having a central outlet if the pressure is not considerable one may employ instead of balls other solid non-compressible bodies having the required resistance.

In Figs. 10 and 11 the apparatus is of annular form, Fig. 10 being a vertical section, Fig. 11 a plan view. The ball-collector is placed immediately under the ring containing the balls. It may be provided with one or more outlet openings. The bottom of the ring is here sloping against the outlet opening.

In Figs. 10 and 11: $a^4$ is the ring, $b^4$ the outlet opening, $c^4$ the annular cover, $d^4$ the locking plug, $f^4$ the ball-collector, $i^4$ the loosening member operated by the lever $m^4$ pivoted around the axis $l^4$, $k^4$ the bottom closing the ball-collector, and provided with one or more openings $n^4$ for removing the balls. $q$ is the cap-bolt connecting the head of the frame with the frame itself.

Whilst the ring form heretofore has been described as consisting of a hollow ring in which the annular cover fits, it may be formed of a flanged pot-like cover or a cover with countersunken bottom and a ring having an interior collar at its bottom. This device is shown in Figs. 12 and 13, Fig. 12 being a vertical section and Fig. 13 a plan view.

In these two figures, $c^5$ is the cover with countersunken bottom $c^{10}$, $a^5$ is the outer flanged ring. Both are united in such a manner that an annular hollow space $r^5$ for receiving the balls or the like is formed. The outer flange of the cover carries an opening $s^5$ for filling the balls into the annular space $r^5$.

To avoid displacing of the parts $a^5$ and $c^5$, clamps $e^5$ may be secured to the ring $a^5$. Instead of these clamps, a ring may be used having the same cross-section as the clamps and protecting the apparatus against dust and the like.

$b^5$ is the outlet-opening, $d^5$ the plug, $i^5$ the loosening member, $p^5$ the opening, through which this loosening member penetrates the ball-collector $f^5$, $n^5$ the opening for removing the balls from the ball-collector, $t^5$ the breaking-pot of the frame standing on the countersunken bottom.

For introducing the balls, the cover $c^5$ is so positioned that an annular space $r^5$ of sufficient height is formed. This space is filled with balls through opening $s^5$, whereupon the latter is closed by a screw.

In Figs. 14 and 15 the annular vessel is formed by two rings of angular cross section, which the cap-bolt passes through. Fig. 14 shows a vertical cross-section. Fig. 15 a plan view of the apparatus. Most of the reference letters signify the same parts as in Figs. 12 and 13.

Figure 17:
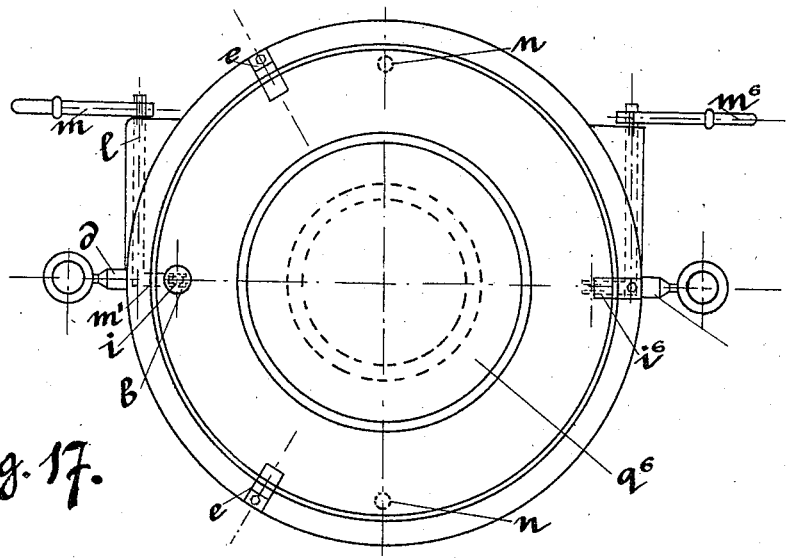

Instead of being secured laterally to the lower ring, the ball-collector may be formed by casting as shown in Figs. 16 and 17, of which Fig. 16 is a vertical section, Fig. 17 a plan view. The parts corresponding to the same or similiar parts of Figs. 14 and 15 are marked likewise.

$m^6$, $m^7$ are the levers for operating the loosening member $i^6$ pivoted around the shafts, $q^6$ is the cap-bolt of the frame of the rolling-mill.

Whilst hitherto the balls have been described as flowing out of the interior of the vessel, the pressure may be discharged by withdrawing a wedge-like body projecting into the balls. The balls then replace the withdrawn body, the cover is lowered and the pressure of the rolls is done away with. This device is shown in Figs. 18 and 19, of which Fig. 18 is a vertical, Fig. 19 a horizontal section through the apparatus.

$a^8$ is the cylinder, $r^8$ its cavity filled with balls, $c^8$ the piston-like cover, $u^8$ the wedge-like body projecting into the cavity filled with balls, $b^8$ the opening of the cylinder $a^8$, through which the body $u^8$ is withdrawn, $o^8$ the rod for removing the body $u^8$, $w^8$ the jack carrying the rod $o^8$, and $x$ the sleeve for guiding the rod $v$.

The body $u^8$ is operated by means of levers or screws. Instead of steel balls, in the case of reduced pressures sand or other globular bodies of sufficient strength may be employed. A plurality of wedge-like bodies $u^8$ may be provided in the same cavity. In Figs. 1 to 19 only cylindrical, conical or angular forms of the ball-container are provided. In the last-mentioned case, the ball-container may be of any form.

Also one of the main parts securing the rolls, for instance the wedges and brackets may be provided with recesses, which may be filled with balls and serve for loosening the rolls. In Figs. 20, 21 and 22 a wedge is provided with such a recess. Fig. 20 shows a vertical longitudinal section through the system of wedges, Fig. 21 a vertical cross section, and Fig. 22 a plan view.

1 means the upper stationary wedge, 2 a recess secured in this wedge filled with balls, 3 the cover closing the recess (Fig. 22), 4 the outlet-opening, 5 the plug, 6 the rod for removing the obstructions, 7 the ball-collector, 8 the opening through which the loosening member 6 penetrates into the ball-collector, 8' the opening for removing the balls from the ball-collector, 9 the inferior movable wedge, 10 the thread of this wedge, 11 the corresponding sleeves, 12 the frame of the rolling-mill, 13 the bracket of the frame, which receives the pressure from the rolls, 14 the middle intermediate block of the frame.

In the case of sheet-rolling-mills, the rolls of which are exposed to strong blows or strokes and in which on the other hand the ingot shall be reduced to the desired thickness by repeatedly rolling to and fro, such devices may be advantageously employed for avoiding the breaking of the journals. Besides the provided outlet-opening the roll-looseners are then provided with a pressure regulating device, which consists of a piston moving in a cylinder. This piston is adjusted by means of a counter-weight or an helical spring so that no sooner is it displaced than the force exerted by the balls surpasses the resistance of the counter-weight or of the helical spring.

Such devices are shown in Figs. 23 to 26. Figs. 23 and 25 are vertical, Figs. 24 and 26 are horizontal cross sections. Concurrently in Figs. 23 to 26 $a^9$ means the cylinder, $b^9$ the piston-like cover, $r''$ the ball-vessel, 15 the opening by which the cylinder 16 is discharged, 17 the piston receiving the pressure, 18 the piston-rod, $b^9$ (Figs. 24 and 26) the outlet opening, $d^9$ the plug, $f^9$ the ball-collector, $i^9$ the percussor.

In Figs. 23 and 24, 19 is the lever pivoted around the shaft 20, 21 the rod bearing the counter-weight 22 and operating the lever 19.

In Figs. 25 and 26, 23 is the helical spring. The wedges shown in Figs. 13 and 14 also may be subjected to the pressure of springs or weights.

In Fig. 27 the different places are indicated where the apparatus may be disposed.

In the place marked "I" it is arranged between the pressure screw 24 and the block 25. Should notwithstanding this device the breaking-pot be necessary, it may be inserted between "I" and the pressure screw. In heavy rolling trains, it may be of advantage to protect this device against exaggerated pressure. In this case it is disposed at "II" under the nut 26 of the cap-bolt 9. 1, 9 represent the wedges securing the cap-bolts to the standard. In this case cylinder and cover are made annular.

When the loosening device is disposed at "I" and "II", the upper and the middle roller may be promptly loosened.

When disposed at "II" the apparatus effects the loosening of the roll-pressure between the middle and the under roller. The device is inserted between bracket 27 and bracket-screw 28 of the middle roller. It may also be arranged between the bracket and the "intermediate block." When the middle roller is held by means of wedges instead of the bracket, it is sufficient to place the device between the wedge and the "intermediate piece".

For loosening the rollers of the housing-frames, it is only necessary to dispose the apparatus in one post, as the pressure is done away with, as soon as one side of the rollers is discharged.

In the rolling-process strong blows are produced between the rollers at the moment when the ingot is seized, so that balls as hard as glass would be shattered, whilst not hardened balls would be flattened. To reduce the brittleness of the balls, the balls are tempered at 400 to 450° C.

Instead of balls cylindrical bodies (rolls) may be employed. The ball-containers are then made of prismatic form, and the outlet openings of rectangular cross-section.

What I claim is:—

1. Apparatus for suddenly loosening the pressure in rolling-mills, consisting of a suitable container open at the top and filled with solid bodies capable of running out of the said container, a cover closing the said container and adapted to sink into the same, and means for suddenly reducing the quantity of the said bodies contained in the said container.

2. Apparatus for suddenly loosening the pressure in rolling-mills, consisting of a suitable container open at the top and filled with balls, a cover closing the said container and adapted to sink into the same, and means for suddenly reducing the quantity of the said balls contained in the said container.

3. Apparatus for suddenly loosening the pressure in rolling-mills, consisting of a suitable container open at the top and filled with solid bodies sliding readily against each other, a cover closing the said container and adapted to sink into the same, and means for suddenly discharging the said bodies out of the said container.

4. Apparatus for suddenly loosening the pressure in rolling-mills, consisting of a suitable container open at the top and filled with steel-balls, a cover closing the said container and adapted to sink into the same, and a plug closing an outlet-opening provided in the said container.

5. Apparatus for suddenly loosening the pressure in rolling-mills, consisting of a suitable container open at the top and filled with steel-balls, a cover closing the said container and adapted to sink into the same, a plug closing an outlet-opening provided in the said container, and means for driving a rod into the said opening after removing the said plug.

6. Apparatus for suddenly loosening the pressure in rolling-mills, consisting of a suitable container open at the top and filled with steel-balls, a cover closing the said container and adapted to sink into the same, a plug closing an outlet-opening provided in the said container, and a suitable vessel secured to the said outlet-opening for receiving the balls.

7. Apparatus for suddenly loosening the pressure in rolling-mills, consisting of a suitable container open at the top and filled with bodies sliding readily against each other, a cover closing the said container and adapted to sink into the same, a plug closing an outlet-opening provided in the bottom of the said container, a suitable vessel attached to the said bottom, a rod, and a lever mechanism to drive said rod into said opening after removing the said plug.

8. Apparatus for suddenly loosening the pressure in rolling-mills, consisting of a ring having an interior collar at the bottom, a pot-like cover fitting into the said collar and having at the top a collar fitting into the said ring, the space between the ring and the cover being filled with bodies sliding readily against each other, and means for suddenly reducing the quantity of the said bodies.

9. Apparatus for suddenly loosening the pressure in rolling-mills, consisting of a ring having an interior collar at the bottom, an annular groove in the said collar, a pot-like cover fitting into the said collar and having at the top a collar fitting into the said ring, the space between the ring and the cover being filled with bodies sliding readily against each other, and means for passing the said bodies into the said annular groove.

10. Apparatus for suddenly loosening the pressure in rolling mills, comprising a stationary wedge between the "intermediate piece" and the bracket of the standard with a cavity filled with bodies sliding readily against each other, closing the said cavity with a fitting cover, and providing means for suddenly reducing the quantity of the said bodies contained in the said cavity.

11. Apparatus for suddenly loosening the pressure in rolling-mills, consisting of a suitable container open at the top and filled with bodies sliding readily against each other, a cover closing the said container and adapted to sink into the same, and means for regulating the pressure exerted by the said bodies.

12. Apparatus for suddenly loosening the pressure in rolling-mills, consisting of a suitable container open at the top and filled with bodies sliding readily against each other, a cover closing the said container and adapted to sink into the same, a cylinder communicating with the said container, and a weight-charged piston operating in the said cylinder.

In testimony whereof I affix my signature in presence of two witnesses.

N. METZ.

Witnesses:
T. S. SCHAEFER,
J. MULLER.